(12) United States Patent
Louapre et al.

(10) Patent No.: US 9,676,981 B2
(45) Date of Patent: Jun. 13, 2017

(54) SHAPED ABRASIVE PARTICLE FRACTIONS AND METHOD OF FORMING SAME

(71) Applicant: Saint-Gobain Ceramics & Plastics, Inc., Worcester, MA (US)

(72) Inventors: David Louapre, Newton, MA (US); James A. Salvatore, Sutton, MA (US); Alexandra Marazano, Romans sur Isère (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 123 days.

(21) Appl. No.: 14/582,448

(22) Filed: Dec. 24, 2014

(65) Prior Publication Data

US 2016/0186028 A1 Jun. 30, 2016

(51) Int. Cl.
  *B24D 3/00* (2006.01)
  *B24D 3/02* (2006.01)
  *B24D 11/00* (2006.01)
  *B24D 18/00* (2006.01)
  *C09K 3/14* (2006.01)
  *B01J 2/26* (2006.01)

(52) U.S. Cl.
  CPC .............. *C09K 3/1418* (2013.01); *B01J 2/26* (2013.01); *C09K 3/1409* (2013.01)

(58) Field of Classification Search
  USPC .......................................... 51/309, 293, 307
  See application file for complete search history.

(56) References Cited

U.S. PATENT DOCUMENTS

| 345,604 | A | 7/1886 | Semper |
| 1,910,444 | A | 5/1933 | Nicholson |
| 2,049,874 | A | 8/1936 | Sherk |
| 2,148,400 | A | 2/1939 | Crompton, Jr. |
| 2,248,064 | A | 7/1941 | Carlton et al. |
| 2,248,990 | A | 7/1941 | Heany |
| 2,290,877 | A | 7/1942 | Heany |
| 2,318,360 | A | 5/1943 | Benner et al. |
| 2,376,343 | A | 5/1945 | Carlton |

(Continued)

FOREIGN PATENT DOCUMENTS

| CA | 743715 A | 10/1966 |
| CA | 2423788 A1 | 7/2002 |

(Continued)

OTHER PUBLICATIONS

International Search Report for PCT/US2015/000344, dated Apr. 4, 2016, 1 page.

(Continued)

*Primary Examiner* — James McDonough
(74) *Attorney, Agent, or Firm* — Abel Law Group, LLP; Adam Keser

(57) ABSTRACT

A method of forming a shaped abrasive particle including forming a precursor shaped abrasive particle having a body including at least one predetermined stress concentration point and at least one predetermined stress concentration vector and processing the precursor shaped abrasive particle and fracturing the precursor shaped abrasive particle substantially along the predetermined stress concentration vector to form a fractured shaped abrasive particle.

20 Claims, 4 Drawing Sheets

(56) References Cited

U.S. PATENT DOCUMENTS

| | | |
|---|---|---|
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe et al. |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |

(56) References Cited

U.S. PATENT DOCUMENTS

| | | |
|---|---|---|
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 * | 9/2001 | Celikkaya ............ C04B 35/1115 451/28 |
| 6,306,007 B1 * | 10/2001 | Mori ....................... B21B 28/04 451/5 |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 * | 5/2002 | Araki ..................... C04B 35/5935 257/E23.009 |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei et al. |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |

(56) References Cited

U.S. PATENT DOCUMENTS

| | | |
|---|---|---|
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 * | 5/2013 | Gonzales ............ C11D 3/3749 510/130 |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0018802 A1 | 1/2004 | Welygan et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |

(56) References Cited

U.S. PATENT DOCUMENTS

| | | |
|---|---|---|
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1* | 8/2013 | Braun .................. C09C 1/24 51/307 |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0325917 A1 | 11/2014 | Braun et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapre et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |

(56) References Cited

FOREIGN PATENT DOCUMENTS

| | | |
|---|---|---|
| JP | 5238726 B2 | 7/2013 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2016/064726 A1 | 2/2016 |
| WO | 20161028683 A1 | 2/2016 |
| WO | 2016/044158 A1 | 3/2016 |
| WO | 2016/089675 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/196795 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |

OTHER PUBLICATIONS

"Investigation of Shaped Abrasive Particles Vol. 1: Review of U.S. Pat. No. 6,054,093 Apr. 25, 2000" © Apr. 2011, 5 pages.
Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E, "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E, "Analytical Engineering Model of the Screen Printing Process: Part I," Solid State Technology, Aug. 1988, pp. 107-111.
Winter Catalogue No. 5, Dressing tools, WINTER diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.

(56) References Cited

OTHER PUBLICATIONS

Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.

\* cited by examiner

SHAPED ABRASIVE PARTICLE FRACTIONS AND METHOD OF FORMING SAME

BACKGROUND

Field of the Disclosure

The following is directed to shaped abrasive particles, and more particularly, to shaped abrasive particles having certain features and methods of forming such shaped abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

SUMMARY

According to a first aspect, a shaped abrasive particle fraction includes a body including a bottom surface, an upper surface, and a side surface extending between the bottom surface and the upper surface, wherein the upper surface defines a shovel shape including a concave surface having a tip region including at least one tip corner and at least one rear region defining at least one rear corner, wherein the tip corner has a tip sharpness that is greater than a tip sharpness of the at least one rear corner.

In another aspect, a method of forming a shaped abrasive particle includes forming a precursor shaped abrasive particle having a body including at least one predetermined stress concentration point and at least one predetermined stress concentration vector and processing the precursor shaped abrasive particle and fracturing the precursor shaped abrasive particle substantially along the predetermined stress concentration vector to form a fractured shaped abrasive particle

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to methods of forming shaped abrasive particle fractions and features of such shaped abrasive particle fractions. The shaped abrasive particle fractions may be used in various abrasive articles, including for example bonded abrasive articles, coated abrasive articles, and the like. Alternatively, the shaped abrasive particle fractions of the embodiments herein may be utilized in free abrasive technologies, including for example grinding and/or polishing slurries.

The shaped abrasive particle fractions of the embodiments herein may be obtained through various processing methods, including but not limited to, printing, molding, pressing, stamping, casting, extruding, cutting, fracturing, heating, cooling, crystallizing, rolling, embossing, depositing, etching, scoring, drying, and a combination thereof. Particular methods of shaping can include the formation of a mixture, such as a sol-gel, that can be shaped in an opening of a production tooling (e.g., a screen or mold), and formed into a precursor shaped abrasive particle. Screen printing methods of forming shaped abrasive particles are generally described in U.S. Pat. No. 8,753,558. A suitable method of forming shaped abrasive particles according to a conventional molding process is described in US Pat. No. 5,201,916.

Figure 1A:
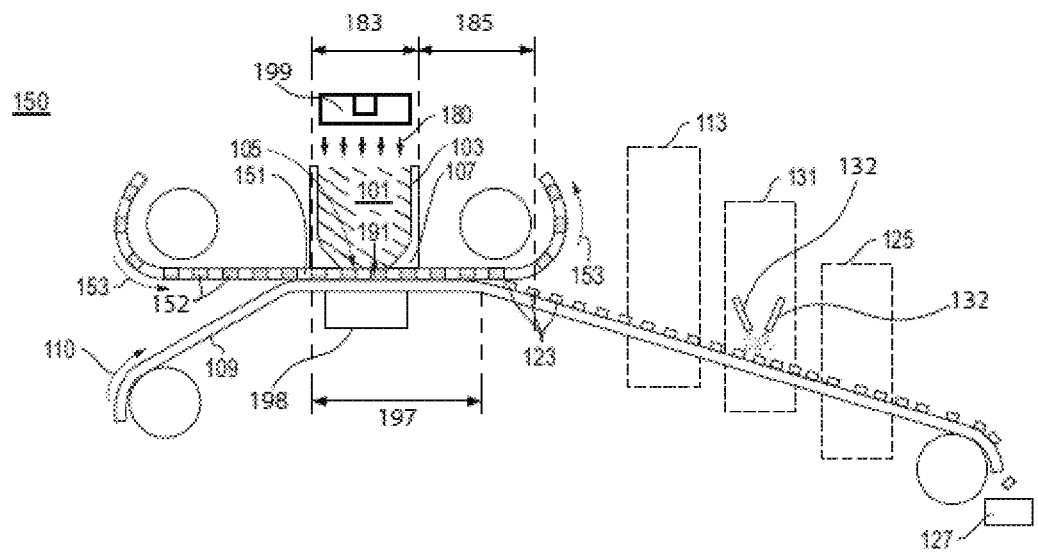
FIG. 1A includes a portion of a system for forming shaped abrasive particle fractions in accordance with an embodiment.

According to one particular embodiment, the process of forming the shaped abrasive particles can be a screen printing process. FIG. 1A includes an illustration of a system 150 for forming shaped abrasive particle fractions in accordance with one, non-limiting embodiment. The process of forming shaped abrasive particle fractions can be initiated by forming a mixture 101 including a ceramic material and a liquid. In particular, the mixture 101 can be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being Al2O3.H2O and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $2 \times 10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In at least one non-limiting embodiment, the mixture 101 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1A, can include a die 103. As illustrated, the mixture 101 can be provided within the interior of the die 103 and configured to be extruded through a die opening 105 positioned at one end of the die 103. As further illustrated, extruding can include applying a force 180 (such as a pressure) on the mixture 101 to facilitate extruding the mixture 101 through the die opening 105. During extrusion within an application zone 183, a production tool or production tool 151 can be in direct contact with a portion of a belt 109. The screen printing process can include extruding the mixture 101 from the die 103 through the die opening 105 in a direction 191. In particular, the screen printing process may utilize the production tool 151 such that, upon extruding the mixture 101 through the die opening 105, the mixture 101 can be forced into an opening 152 in the production tool 151.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Figure 1B:
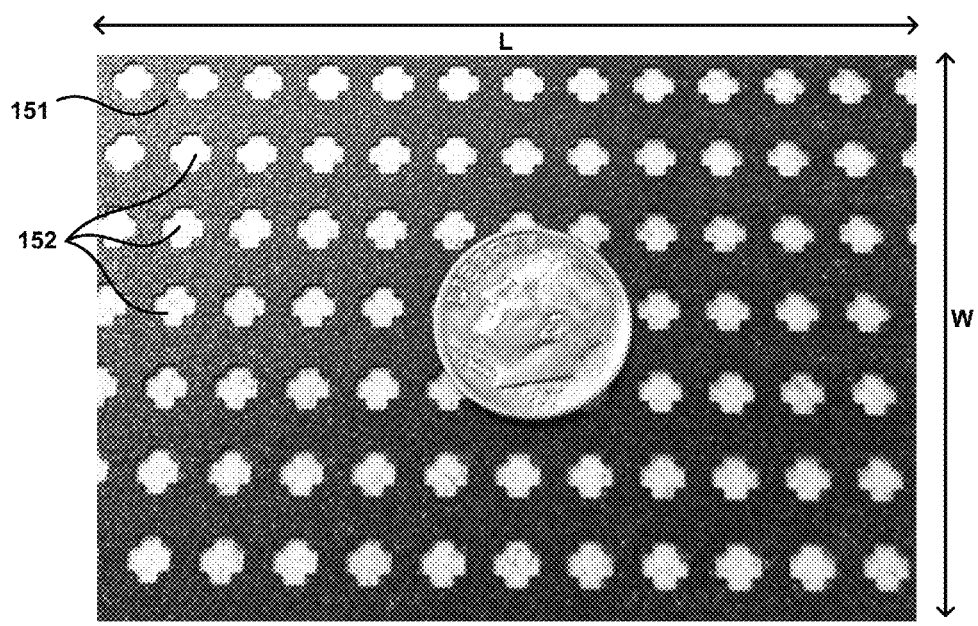
FIG. 1B includes an image of a portion of the production tool of the system of FIG. 1A for forming a shaped abrasive particle fractions in accordance with an embodiment.

Referring briefly to FIG. 1B, a portion of the production tool (e.g., a screen) 151 is illustrated. As shown, the production tool 151 can include the opening 152, and more particularly, a plurality of openings 152 extending through the volume of the production tool 151. In accordance with an embodiment, the openings 152 can have a two-dimensional shape as viewed in a plane defined by the length (L) and width (W) of the screen. As illustrated in FIG. 1B, the openings 152 have generally cross-shaped two-dimensional shapes. However, it will be appreciated that the production tool 151 can have openings 152 including other two-dimensional shapes, including but not limited to polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as a triangle, a rectangle, a quadrilateral, a pentagon, a hexagon, a heptagon, an octagon, a nonagon, a decagon, and a combination thereof.

As illustrated and in accordance with one embodiment, each of the openings 152 can have substantially the same orientation relative to each other, and substantially the same orientation relative to the surface of the production tool 151. Still, it will be appreciated that the openings 152 may not necessarily be arranged in rows. The openings 152 may be arranged in various particular ordered distributions with respect to each other on the production tool 151, such as in the form of a two-dimensional pattern. Alternatively, the openings may be disposed in a random manner on the production tool 151.

Referring again to FIG. 1A, after forcing the mixture 101 through the die opening 105 and a portion of the mixture 101 through the openings 152 in the production tool 151, one or more precursor shaped abrasive particles 123 may be printed on the belt 109 disposed under the production tool 151. According to a particular embodiment, the precursor shaped abrasive particles 123 can have a shape substantially replicating the shape of the openings 152. Notably, the mixture 101 can be forced through the production tool 151 in rapid fashion, such that the average residence time of the mixture 101 within the openings 152 can be less than about 2 minutes, less than about 1 minute, less than about 40 seconds, or even less than about 20 seconds. In particular non-limiting embodiments, the mixture 101 may be substantially unaltered during printing as it travels through the screen openings 152, thus experiencing no change in the amount of components from the original mixture, and may experience no appreciable drying in the openings 152 of the production tool 151.

Additionally, the system 151 can include a bottom stage 198 within the application zone 183. During the process of forming shaped abrasive particles, the belt 109 can travel over the bottom stage 198, which can offer a suitable substrate for forming.

During operation of the system 150, the production tool 151 can be translated in a direction 153 while the belt 109 can be translated in a direction 110 substantially similar to the direction 153, at least within the application zone 183, to facilitate a continuous printing operation. As such, the precursor shaped abrasive particles 123 may be printed onto the belt 109 and translated along the belt 109 to undergo further processing. It will be appreciated that such further processing can include processes described in the embodiments herein, including for example, shaping, application of other materials (e.g., dopant material), drying, and the like.

In some embodiments, the belt 109 and/or the production tool 151 can be translated while extruding the mixture 101 through the die opening 105. As illustrated in the system 100, the mixture 101 may be extruded in a direction 191. The direction of translation 110 of the belt 109 and/or the production tool 151 can be angled relative to the direction of extrusion 191 of the mixture 101. While the angle between the direction of translation 110 and the direction of extrusion 191 is illustrated as substantially orthogonal in the system 100, other angles are contemplated, including for example, an acute angle or an obtuse angle.

The belt 109 and/or the production tool 151 may be translated at a particular rate to facilitate processing. For example, the belt 109 and/or the production tool 151 may be translated at a rate of at least about 3 cm/s. In other embodiments, the rate of translation of the belt 109 and/or the production tool 151 may be greater, such as at least about 4 cm/s, at least about 6 cm/s, at least about 8 cm/s, or even at least about 10 cm/s. Still, in at least one non-limiting embodiment, the belt 109 and/or the production tool 151 may be translated in a direction 110 at a rate of not greater than about 5 m/s, not greater than about 1 m/s, or even not greater than about 0.5 m/s. It will be appreciated that the belt 109 and/or the production tool 151 may be translated at a rate within a range between any of the minimum and maximum values noted above, and moreover, may be translated at substantially the same rate relative to each other. Furthermore, for certain processes according to embodiments herein, the rate of translation of the belt 109 as compared to the rate of extrusion of the mixture 101 in the direction 191 may be controlled to facilitate proper processing.

After the mixture 101 is extruded through the die opening 105, the mixture 101 may be translated along the belt 109 under a knife edge 107 attached to a surface of the die 103. The knife edge 107 may define a region at the front of the die 103 that facilitates displacement of the mixture 101 into the openings 152 of the production tool 151.

Certain processing parameters may be controlled to facilitate formation of particular features of the precursor shaped abrasive particles 123 and the finally-formed shaped abrasive particle fractions described herein. Some exemplary process parameters that can be controlled include a release distance 197, a viscosity of the mixture, a storage modulus of the mixture, mechanical properties of the bottom stage, geometric or dimensional characteristics of the bottom stage, thickness of the production tool, rigidity of the production tool, a solid content of the mixture, a carrier content of the mixture, a release angle, a translation speed, a temperature, a content of release agent, a pressure exerted on the mixture, a speed of the belt, a drying rate, a drying time, a drying temperature, and a combination thereof.

According to one embodiment, one particular process parameter can include controlling the release distance 197 between a filling position and a release position. In particular, the release distance 197 can be a distance measured in a direction 110 of the translation of the belt 109 between the end of the die 103 and the initial point of separation between the production tool 151 and the belt 109.

After extruding the mixture 101 into the openings 152 of the production tool 151, the belt 109 and the production tool 151 may be translated to a release zone 185 where the belt 109 and the production tool 151 can be separated to facilitate the formation of the precursor shaped abrasive particles 123. In accordance with an embodiment, the production tool 151 and the belt 109 may be separated from each other within the release zone 185 at a particular release angle.

Thereafter, the precursor shaped abrasive particles 123 may be translated through a series of zones wherein various treating processes may be conducted. Some suitable exemplary treating processes can include drying, heating, curing, reacting, radiating, mixing, stifling, agitating, planarizing, calcining, sintering, comminuting, sieving, doping, and a combination thereof. According to one embodiment, the precursor shaped abrasive particles 123 may be translated through an optional shaping zone 113, wherein at least one exterior surface of the particles may be shaped as described in embodiments herein. Furthermore, the precursor shaped abrasive particles 123 may be translated through an optional application zone 131, wherein a dopant material can be applied to at least one exterior surface of the particles by application heads 132.

After forming precursor shaped abrasive particles 123, the particles may be translated through a post-forming zone 125. Various processes may be conducted in the post-forming zone 125, including treatment of the precursor shaped abrasive particles 123. In one embodiment, the post-forming zone 125 can include processing the precursor shaped abrasive particles and fracturing the precursor shaped abrasive particles substantially along their predetermined stress concentration vector to form fractured shaped abrasive particles, which may also be referred to as shaped abrasive particle fractions.

According to one embodiment, the processing in the post-forming zone 125 can include drying. In one instance, drying can be conducted after removing the mixture 101 from the openings 152, such that the precursor shaped abrasive particles 123 are formed with substantially the same moisture content in the mixture 101 as present during the extrusion process. Notably, removing the mixture from the opening can be completed prior to complete drying of the mixture in the openings 152 of the production tool 151.

Drying may include removal of a particular content of material, including volatiles, such as water. In accordance with an embodiment, the drying of the precursor shaped abrasive particles 123 can include controlling at least one of a drying rate, a drying time, a drying temperature, and a combination thereof. More particularly, drying may include controlling a drying operation to fracture the precursors shaped abrasive particles along the at least one predetermined stress concentration vector to form a plurality of shaped abrasive particle fractions.

In at least one embodiment, drying may be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. For example, in at least one embodiment, the precursor shaped abrasive particles can be dried at approximately 50° C.-80° C. to induce intentional fracturing at a predetermined stress concentration point and along a predetermined stress concentration vector. Furthermore, the precursor shaped abrasive particles 123 may be translated through the post-forming zone 125 at a particular rate, such as at least about 0.2 feet/min and not greater than about 8 feet/min to control the residence time of the particles in the drying process.

Furthermore, the drying process may be conducted for a particular duration. For example, the drying process may be not greater than about six hours, such as not greater than about 5 hours, not greater than about 4 hours, not greater than about 2 hours, or even not greater than about 1 hour. Still, the drying process may be at least about 1 min, such as at least about 2 minutes. It will be appreciated that the drying duration may be within a range between any of the minimum and maximum temperatures noted above. For example, in at least one embodiment, the precursor shaped abrasive particles can be dried for a duration of 1 to 10 minutes, which may facilitate intentional fracturing at a predetermined stress concentration point and along a predetermined stress concentration vector.

After the precursor shaped abrasive particles 123 are translated through the post-forming zone 125, the shaped abrasive particle fractions may be removed from the belt 109 and collected in a bin 127 for further processing.

The process of forming shaped abrasive particle fractions may further comprise a sintering process. Sintering of the shaped abrasive particle fractions may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

Figure 2:
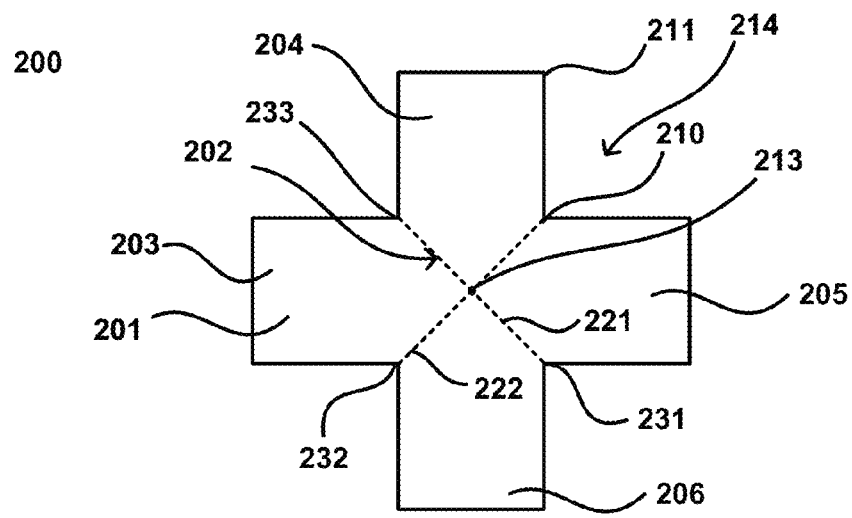
FIG. 2 includes a top down illustration of a precursor shaped abrasive particle according to an embodiment.

FIG. 2 includes a top down view of an illustration of a precursor shaped abrasive particle according to an embodiment. As illustrated, the precursor shaped abrasive particle 200 has a body 201 having a polygonal two-dimensional shape. In at least one embodiment, the precursor shaped abrasive particle 200 comprises a two-dimensional shape as viewed top down having at least one internal corner 210 and one external corner 211. Notably, the internal corner can be closer to the midpoint 213 of the body than the external corner. In certain shapes of the embodiments herein, the body 201 can include least one concave portion 214. The concave portion 214 can include an internal corner 210. In other instances, the concave portion 214 can define a portion of the periphery of the body that extends inward from two points and defines a portion of the periphery that is closer to the midpoint 213 relative to the two points.

More particularly, the body 201 can have a cross-shaped two-dimensional shape having at least one arm extending from a central portion 202 of the body 201. According to the illustrated embodiment, the body 201 includes a central portion 202, a first arm 203 extending from the central portion 202, a second arm 204 extending from the central portion 202, a third arm 205 extending from the central portion 202, and a fourth arm 206 extending from the central portion 202. The central portion can include the midpoint 213 of the body 201.

It will be appreciated that while the illustrated embodiment of FIG. 2 demonstrates a generally cross-shaped two-dimensional shape, other shapes are contemplated. Including for example, but not limited to a star shape, a Y-shape, a quadrilateral, a pentagon, a hexagon, a heptagon, an octagon, a nonagon, a decagon, and a combination thereof.

According to one embodiment, the body 201 is formed such that it includes at least one predetermined stress concentration point, such as point 231. For the body 201, the internal corners 210, 231, 232, and 233 may each define a predetermined stress concentration point of the body 201. Furthermore, the body 201 may include at least one predetermined stress concentration vector, such as the predetermined stress concentration vector 221. In the illustrated embodiment of FIG. 2, the body 201 includes a first predetermined stress concentration vector 221 and a second predetermined stress concentration vector 222. The first predetermined stress concentration vector 221 and the second predetermined stress concentration vector 222 can intersect each other in the central portion 202 of the body 201, and more particularly, can extend through the midpoint 213 of the body. In a particular instance, the first predetermined stress concentration vector 221 and the second predetermined stress concentration vector 222 can intersect each other proximate to the midpoint 213 of the body. The predetermined stress concentration points and vectors can be engineered by controlling the two-dimensional shape of the body 201.

The predetermined stress concentration point may be controlled by modifying one or more factors including the shape of the mold, the shape of the precursor shaped abrasive particles, processing conditions (e.g., drying conditions), localized treatments by additives, mechanical manipulation, and a combination thereof. The predetermined stress concentration point can create a region of stress within the body of the precursor shaped abrasive particle. According to one embodiment, a localized treatment can include a hydrophobic treatment of a portion of the surface of the precursor shaped abrasive particle. In yet another embodiment, a predetermined stress concentration point may be created in the precursor shaped abrasive particle by heterogeneities in the microstructure. Moreover, the predetermined stress concentration vector can define the most probable crack propagation path orthogonal to the lines of maximum principle stress in the body of the precursor shaped abrasive particle. The predetermined stress concentration vector can be controlled by one or more factors including the shape of the mold, the shape of the precursor shaped abrasive particles, processing conditions (e.g., drying conditions), localized treatments by additives, mechanical manipulation, and a combination thereof.

According to an embodiment, the shape of the precursor shaped abrasive particles and the forming process are controlled relative to each other to facilitate fracturing of the precursor shaped abrasive particles in a controlled manner. The shape of the precursor shaped abrasive particle, which is related to the shape of the openings 152 in the production tool 151 can be tailored with the forming process, including the drying process, such that the one or more predetermined stress concentration points and the one or more predetermined stress concentration vectors define a likely propagation path of a crack through the body 201. The drying operation can be tailored to facilitate initial fracturing of the precursor shaped abrasive particles at the one or more predetermined stress concentration points. The initial cracks are then likely to propagate along the one or more predetermined stress concentration vectors. It will be appreciated that the precursor shaped abrasive particles can have a different two-dimensional shape that would also facilitate the formation of a predetermined stress concentration point and a predetermined stress concentration vector.

The process can be controlled to ensure suitable fracturing of the precursor shaped abrasive particles. For example, at least a majority, such as at least about 65%, at least about 75% or even at least about 95% of the precursor shaped abrasive particles are fractured during processing to create shaped abrasive particle fractions. Moreover, at least a majority, such as at least about 65%, at least about 75% or even at least about 95% of the precursor shaped abrasive particles are fractured in the same manner relative to each other, such that the shaped abrasive particle fractions have substantially the same shape.

Figure 3:
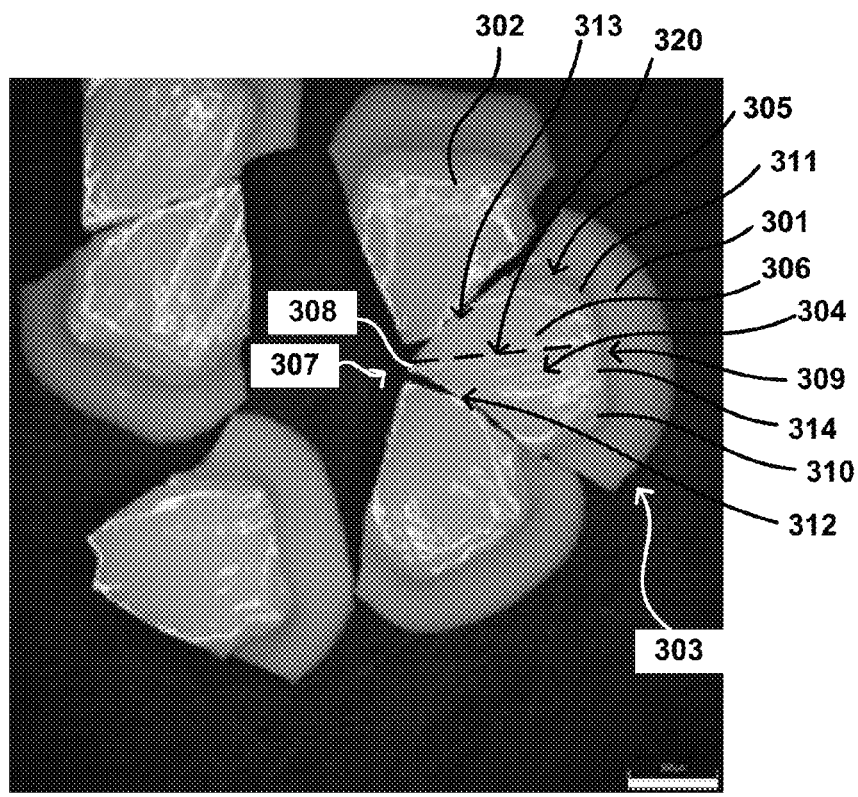
FIG. 3 includes an image of shaped abrasive particle fractions according to an embodiment.

FIG. 3 includes an image of shaped abrasive particle fraction according to an embodiment. As can be seen in the image of FIG. 3, fracturing includes forming at least a first shaped abrasive particle 301 fraction and a second shaped abrasive particle fraction 302. According to one embodiment, the first and second shaped abrasive particle fractions 301 and 302 have a substantially similar shape relative to each other.

The first shaped abrasive particle fraction 301 can have a bottom surface 303, an upper surface 304, and a side surface 305 extending between the bottom surface 303 and the upper surface 304. The upper surface can define a shovel shape including a concave surface 306 having a tip region 307 including at least one tip corner 308. The body 301 can further include at least one rear region 309 defining at least one rear corner 310. According to a particular embodiment, the tip corner 308 can have a tip sharpness that is greater than a tip sharpness of the at least one rear corner 310. Moreover, the rear region 309 of the body 301 can have a first rear corner 310 and a second rear corner 311, and wherein the tip corner 308 can have a tip sharpness that is greater than a tip sharpness of the first rear corner 310 and the second rear corner 311.

In certain embodiments, the tip corner 308 can have a tip sharpness that is at least about 50% sharper than the tip sharpness of the first rear corner 310 or the second rear corner 311. The percentage difference in tip sharpness can be calculated according to the formula $[(Tc1-Tc2)/Tc1]\times$ 100%, where Tc1 is the tip having the greater radius of curvature values, which defines the tip sharpness, and Tc2 is the smaller radius of curvature value. The tip sharpness can be a measure of the radius of curvature of the tip, with a lower radius representing a sharper tip. The tip radius can be measured using image analysis such as a Clemex Image Analysis program or ImageJ interfaced with an inverted light microscope or other suitable image analysis software. The radius of curvature for each triangular apex can be estimated by defining three points at each apex when viewed in cross section at 100× magnification. A point is placed at the start of the tip's curve where there is a transition from the straight edge to the start of a curve, at the apex of the tip, and at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius. In another embodiment, the tip corner 308 can have a tip sharpness that is at least about 60% sharper (i.e., a radius of curvature value that is 60% less) than the tip sharpness of the first rear corner 310 or the second rear corner 311, such as 70% sharper, 80% sharper, or even at least 90% sharper. Still, in one non-limiting embodiment, it may be not greater than about 99% sharper or not greater than about 95% sharper.

In an embodiment, the tip corner 308 can have has a tip sharpness that is not greater than about 50 microns, wherein 50 microns is the measure of the radius of curvature of the tip corner 308. In still other instances, the tip corner 308 can have a tip sharpness of not greater than about 40 microns, not greater than about 30 microns, not greater than about 20 microns, or even not greater than about 15 microns. Still, the tip corner 308 can have a tip sharpness of at least about 0.1 microns or at least about 1 micron. It will be appreciated that the tip corner 308 can have a tip sharpness within a range including any of the minimum and maximum values noted above. Furthermore, it will be appreciated that reference herein to any value of tip sharpness can be reference to an average value taken from a suitable sample size of shaped abrasive particle fractions. It is believed that a sharper tip can promote more aggressive cutting an improved fracturing of the shaped abrasive particles during use, especially when combined with the shape of the shaped abrasive particle fractions, including the upper surfaces having the shovel shape.

In an embodiment, the first or second rear corner 310 or 311 can have has a tip sharpness that is at least about 50 microns, wherein 50 microns is the measure of the radius of curvature of the tip corner 308. In still other instances, the first or second rear corner 310 or 311 can have a tip sharpness of at least about 60 microns, at least about 80 microns, at least about 100 microns, at least about 125 microns, or even at least about 150 microns. Still, the first or second rear corner 310 or 311 can have a tip sharpness of not greater than about 500 microns or even not greater than about 200 microns. It will be appreciated that the first or second rear corner 310 or 311 can have a tip sharpness within a range including any of the minimum and maximum values noted above.

In another instance, the bottom surface 303 can have a rounded contour. More particularly, the side surface 305 can exhibit some flashing or tapering from the upper surface 304 to the bottom surface 303, such that the bottom surface 303 is flared out providing a wide base for the body 301. This may facilitate improved deployment and orientation of the shaped abrasive particle fractions in a coated abrasive. For example, the shape of the shaped abrasive particle fractions may facilitate placement of the shaped abrasive particle fractions in a position to present the tip corner 308 in a cutting position (i.e., in a position pointing away from the backing) and the base closest to the backing with a larger surface area to secure the particles in the adhesives.

According to one embodiment, the upper surface 304 can include a first upper edge 312 and a second upper edge 313. The first upper edge 312 and second upper edge 313 can define a portion of the shovel shape and intersect at the tip region 307. In particular instances, the first upper edge 312 and second upper edge 313 defining fractured edges.

As further illustrated in the shaped abrasive particle fractions of FIG. 3, the rear region 309 can have at least one rear edge 314 joining the upper surface 304 and the side surface 305. The rear edge 314 can have an edge sharpness less than a sharpness of the first upper edge 312 or second upper edge 313. The rear edge 314 can define an unfractured edge. Moreover, the rear edge 314 may have a more rounded contour in comparison to the first upper edge 312 or second upper edge 313.

Finally, as illustrated, in FIG. 3 the shaped abrasive particle fractions can have an upper surface 304 that has a shovel shape. That is, the upper surface 304 can have a depression or concave contour, wherein the first upper edge 312 and second upper edge 313 can define regions of the greatest height on the particle as viewed from the side, while points along the axis 320 of the upper surface may be in the center of the depression or concavity and define regions on the upper surface that are lower in height relative to certain points on the first upper edge 312 or second upper edge 313. Moreover, in certain instances, at least one of the rear corners 310 or 311 and the tip corner 308 are located on the concave surface and at least one of the rear corners 310 or 311 is located at a higher position on the concave surface relative to the tip corner 308. Such features may enable greater abrasive capabilities. Moreover, the fracturing mechanism has been found to facilitate the formation of sharper corners and surfaces than are feasible using conventional shaping processes (e.g., molding).

The shaped abrasive particle fractions obtained through the process of the embodiments herein can have very sharp tips where the intentional cracking occurred and may contain corners that are less sharp along other portions of the perimeter, such as those portions corresponding to the position of outward pointing angles of the opening in the production tool 151. This difference in contour and tip sharpness of the shaped abrasive particles may facilitate orientation of the shaped abrasive particles in an abrasive article (e.g., a coated abrasive) where the sharp tip is presented in a suitable orientation to conduct the initial material removal.

Figure 4:
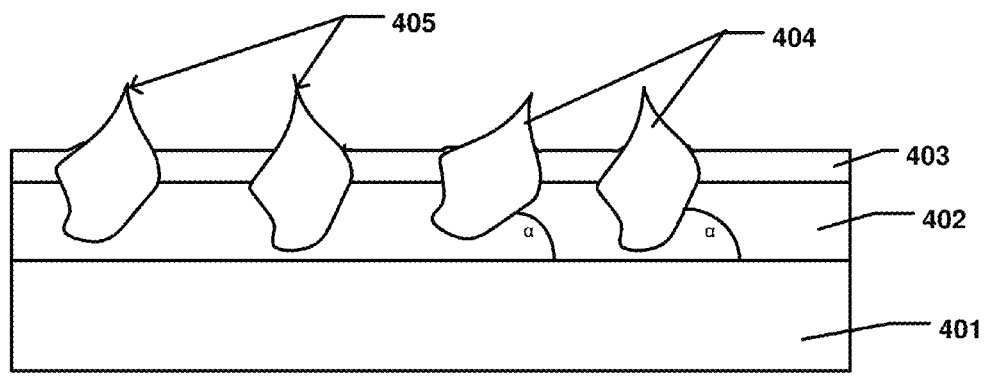
FIG. 4 includes an image of a coated abrasive including shaped abrasive particle fractions according to an embodiment.

For example, as illustrated in FIG. 4, the shaped abrasive particles 404 may be incorporated in a coated abrasive article such that the sharp tips 405 are pointing away from the substrate 401 and the larger more curved base of the shaped abrasive particles facilitate such and orientation and facilitate a strong bond between the shaped abrasive particles 404 and the make coat 402 and size coat 403 of the abrasive article.

It will be appreciated that various methods may be used in the art to control the deployment of the shaped abrasive particles in coated abrasive articles. For example, the shaped abrasive particles 404 may be deposited in a controlled distribution (e.g., a pattern) on the surface of the substrate 401, such that they placement of the shaped abrasive particles relative to each other and relative to a position on the substrate 401 is controlled. Moreover, the orientation of the shaped abrasive particles 404 on the backing may be controlled, such that the sharp tips 405 are pointing away from the substrate 401. Controlled orientation may also include control of the proper tilt angle (a) of the shaped abrasive particles relative to the substrate 401. Various methods may be used to achieve controlled distribution and orientation, including electrostatic deposition methods. It will also be appreciated that the shaped abrasive particles herein may be combined with one or more types of other shaped abrasive particles or diluent particles, which may include conventional abrasive particles.

It will be appreciated that the shaped abrasive particle fractions can be incorporated into other fixed abrasive articles, such as bonded abrasives, non-woven abrasives, thin wheels, grinding wheels, reinforced abrasives, and the like. In the alternative, the shaped abrasive particle fractions of the embodiments herein may be used in slurries as free abrasive particles.

Item 1. A method of forming a shaped abrasive particle comprising:
forming a precursor shaped abrasive particle having a body including at least one predetermined stress concentration point and at least one predetermined stress concentration vector; and
processing the precursor shaped abrasive particle and fracturing the precursor shaped abrasive particle substantially along the predetermined stress concentration vector to form a fractured shaped abrasive particle.

Item 2. The method of item 1, wherein the precursor shaped abrasive particle comprises a two-dimensional shape as viewed top down having at least one internal corner and one external corner, wherein the internal corner is closer to a midpoint of the body than the external corner.

Item 3. The method of item 1, wherein the predetermined stress concentration vector extends through a midpoint of the body.

Item 4. The method of item 1, wherein the precursor shaped abrasive particle comprises a first predetermined stress concentration vector and a second predetermined stress concentration vector, wherein the first predetermined stress concentration vector and the second predetermined stress concentration vector intersect each other, wherein the first predetermined stress concentration vector and the second predetermined stress concentration vector intersect each other within a central portion of the body, wherein the first predetermined stress concentration vector and the second predetermined stress concentration vector intersect each other proximate to a midpoint of the body.

Item 5. The method of item 1, wherein the body comprises a polygonal two-dimensional shape, wherein the body comprises a two-dimensional shape having at least one arm extending from a central portion, wherein the body comprises at least one concave portion defining an internal corner, wherein the central portion includes a midpoint of the body, wherein the body comprises a two-dimensional shape selected from the group consisting of a cross-shape, a star shape, a Y-shape, a quadrilateral, a pentagon, a hexagon, a heptagon, an octagon, a nonagon, a decagon, and a combination thereof.

Item 6. The method of item 1, wherein fracturing includes forming at least a first shaped abrasive particle fraction and a second shaped abrasive particle fraction.

Item 7. The method of item 6, wherein the first and second shaped abrasive particle fractions have a substantially similar shape.

Item 8. The method of item 6, wherein the first shaped abrasive particle fraction comprises a bottom surface, an upper surface, and a side surface extending between the bottom surface and the upper surface, wherein the upper surface defines a shovel shape including a concave surface having a tip region including at least one tip corner and at least one rear region defining at least one rear corner, wherein the tip corner has a tip sharpness that is greater than a tip sharpness of the at least one rear corner.

Item 9. The method of item 1, wherein forming is selected from the group consisting of printing, molding, casting, pressing, extruding, depositing, and a combination thereof, wherein forming comprises depositing a mixture into an opening of a production tool and forming the precursor shaped abrasive particle, wherein forming further comprises removing the mixture from the opening prior to complete drying of the mixture in the opening, wherein forming further comprises removing the mixture from the opening prior to any appreciable drying of the mixture in the opening.

Item 10. The method of item 1, wherein processing includes drying the precursor shaped abrasive particle by controlling at least one of a drying rate, a drying time, a drying temperature, and a combination thereof, wherein processing includes controlling a drying operation to fracture the shaped abrasive particles along the at least one predetermined stress concentration vector to form a plurality of shaped abrasive particle fractions.

Item 11. A shaped abrasive particle fraction comprising a body including a bottom surface, an upper surface, and a side surface extending between the bottom surface and the upper surface, wherein the upper surface defines a shovel shape including a concave surface having a tip region including at least one tip corner and at least one rear region defining at least one rear corner, wherein the tip corner has a tip sharpness that is greater than a tip sharpness of the at least one rear corner.

Item 12. The shaped abrasive particle fraction of item 11, wherein the at least one tip corner has a tip sharpness that is at least about 50% sharper than the tip sharpness of the at least one rear corner.

Item 13. The shaped abrasive particle fraction of item 11, wherein the at least one tip corner has a tip sharpness that is not greater than about 50 microns.

Item 14. The shaped abrasive particle fraction of item 11, wherein the at least one rear corner has a tip sharpness of at least about 50 microns.

Item 15. The shaped abrasive particle fraction of item 11, wherein the bottom surface comprises a rounded contour.

Item 16. The shaped abrasive particle fraction of item 11, wherein the upper surface comprises a first upper edge and a second upper edge, wherein the first upper edge and second upper edge defining a portion of the shovel shape and intersect at the tip region.

Item 17. The shaped abrasive particle fraction of item 16, wherein the first upper edge and second upper edge defining fractured edges.

Item 18. The shaped abrasive particle fraction of item 16, wherein the rear region defines at least one rear edge including the at least one rear corner, and wherein the rear edge has an edge sharpness less than a sharpness of the first upper edge or second upper edge.

Item 19. The shaped abrasive particle fraction of item 18, wherein the at least one rear edge defines an unfractured edge Item 20. The shaped abrasive particle fraction of item 11, wherein the at least one rear corner and one tip corner are located on the concave surface and the at least one rear corner is located at a higher position on the concave surface relative to the at least one tip corner.

EXAMPLE

A gel was formed including 35-40 wt % boehmite commercially available as Catapal B and seeded with 1% alpha alumina seeds. The mixture also included water, 2.5 wt % nitric acid, and organic material. The mixture was extruded through a die opening under a pressure of 8-10 psi and into cross-shaped openings of the production tool provided in FIG. 1B with dimensions of 4 mm in total length, 1 mm for a length of an arm, and 0.6 mm for the depth of the openings.

The production tool was made of metal and had a non-stick polymer coating (e.g., PTFE) on the interior surfaces of the openings. The production tool and belt were moved at a rate of approximately 10 m/min. The production tool was removed before any appreciable drying of the gel and precursor shaped abrasive particles were formed on the belt. The precursor shaped abrasive particles were dried at approximately 50° C.-80° C. for 4-7 minutes to induce intentional fracturing at a predetermined stress concentration points and along predetermined stress concentration vectors. After drying and fracturing, the resulting shaped abrasive particles formed from the precursor shaped abrasive particle were sintered at approximately 1300° C. for approximately 10 minutes to achieve 98% theoretical density.

FIG. 3 includes images of shaped abrasive particle fractions formed according to Example. 1. The average tip sharpness for the tip corners of the shaped abrasive particle fractions was approximately 19.2 microns.

The shaped abrasive particle fractions were tested according to a single grit grinding test (SGGT) in a side orientation. In conducting the SGGT, one single shaped abrasive particle is held in a grit holder by a bonding material of epoxy. The shaped abrasive particle is secured in a side orientation and moved across a workpiece of 304 stainless steel for a scratch length of 8 inches using a wheel speed of 22 m/s and an initial scratch depth of 10 microns. The shaped abrasive particle produces a groove in the workpiece having a cross-sectional area (AR). For each sample set, each shaped abrasive particle completes 5 passes across the 8 inch length, 10 individual particles are tested for each of the orientation and the results are analyzed. The test measures the tangential force exerted by the grit on the workpiece, in the direction that is parallel to the surface of the workpiece and the direction of the groove, and the net change in the cross-sectional area of the groove from beginning to the end of the scratch length is measured to determine the shaped abrasive particle wear. The net change in the cross-sectional area of the groove for each pass can be measured. For the SGGT, the net cross-sectional area of the groove is defined as the difference between the cross-sectional area of the groove below the surface and the cross sectional area of the material displaced above the surface. Performance (Ft/A) is defined as the ratio of the tangential force to the net cross-sectional area of the groove.

Figure 5:
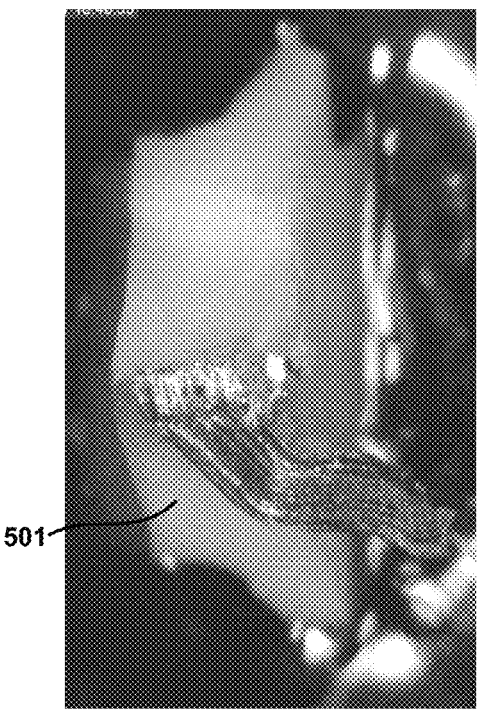
FIG. 5 includes an image of a shaped abrasive particle fraction in a side orientation according to an embodiment.

The SGGT was conducted with a sample set of shaped abrasive particle fractions in a side surface orientation as depicted in FIG. 5, wherein a side surface 501 of each shaped abrasive particle fraction is oriented perpendicular to the grinding direction such that the side surface 501 initiates grinding of the workpiece. The results of the SGGT test using the sample set of shaped abrasive particle fractions in a side orientation allows for measurement of the grinding efficiency of the particle fractions in a side orientation.

Figure 6:
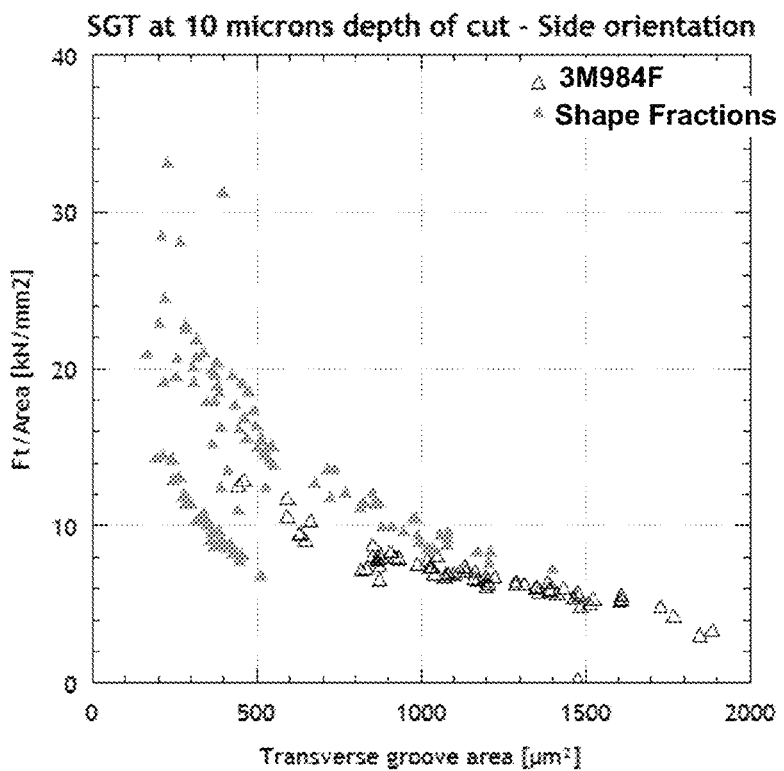
FIG. 6 includes a plot of tangential force divided by groove area as a function of groove area for a sample representative of an embodiment and a conventional sample.
Figure 7:
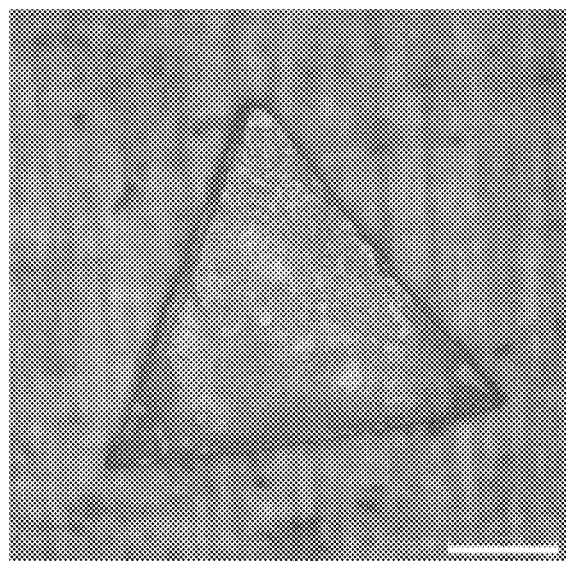
FIG. 7 includes a top down image of a conventional shaped abrasive particle.

FIG. 6 includes a plot of tangential force divided by groove area (as a proxy for specific grinding energy) as a function of groove area, wherein for a given groove area, the lower the tangential force, the better the performance of the particle or particle fraction. The shaped abrasive particle fractions of Example 1 were compared against triangular shaped abrasive particles commercially available as 3M984F from 3M Corporation, one of which is illustrated in FIG. 7 (i.e., the conventional sample). As demonstrated by the plot of FIG. 6, some of the shaped abrasive particle fractions appeared to have the same or better performance relative to the shaped abrasive particles of the conventional sample. Notably, at lower transverse groove area the tangential force per area was lower indicating a lower specific grinding energy and more efficient initial grinding the shaped abrasive particle fractions compared to the conventional shaped abrasive particles.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A shaped abrasive particle fraction comprising a body including a bottom surface, an upper surface, and a side surface extending between the bottom surface and the upper surface, wherein the upper surface defines a shovel shape including a concave surface having a tip region including at least one tip corner and at least one rear region defining at least one rear corner, wherein the tip corner has a tip sharpness that is greater than a tip sharpness of the at least one rear corner, wherein the upper surface comprises a first upper edge and a second upper edge, wherein the first upper edge and second upper edge defining a portion of the shovel shape and intersect at the tip region, wherein the rear region defines at least one rear edge, and wherein the rear edge has an edge sharpness less than a sharpness of the first upper edge or second upper edge, and further wherein the at least one rear edge has a more rounded contour in comparison to the fist upper edge and the second upper edge.

2. The shaped abrasive particle fraction of claim 1, wherein the at least one tip corner has a tip sharpness that is at least about 50% sharper than the tip sharpness of the at least one rear corner.

3. The shaped abrasive particle fraction of claim 1, wherein the at least one tip corner has a tip sharpness that is at least about 90% sharper than the tip sharpness of the at least one rear corner.

4. The shaped abrasive particle fraction of claim 1, wherein the at least one tip corner has a tip sharpness that is not greater than about 50 microns.

5. The shaped abrasive particle fraction of claim 1, wherein the at least one tip corner has a tip sharpness that is not greater than about 15 microns.

6. The shaped abrasive particle fraction of claim 1, wherein the at least one rear corner has a tip sharpness of at least about 50 microns.

7. The shaped abrasive particle fraction of claim 1, wherein the first upper edge and the second upper edge define regions of the greatest height on the body as viewed from the side.

8. The shaped abrasive particle fraction of claim 1, wherein the at least one rear corner is located at a higher position on the concave surface relative to the at least one tip corner.

9. The shaped abrasive particle fraction of claim 1, wherein the at least one rear region comprises a second rear corner.

10. The shaped abrasive particle fraction of claim 9, wherein the at least one tip corner has a tip sharpness that is at least about 50% sharper than the tip sharpness of the second rear corner.

11. The shaped abrasive particle fraction of claim 9, wherein the second rear corner has a tip sharpness of at least about 50 microns.

12. The shaped abrasive particle fraction of claim 1, wherein the bottom surface comprises a rounded contour.

13. The shaped abrasive particle fraction of claim 1, wherein the first upper edge and the second upper edge each define a fractured edge.

14. The shaped abrasive particle fraction of claim 1, wherein the body comprises at least one of an oxide, a nitride, a carbide, a boride, an oxycarbide, an oxynitride, or any combination thereof.

15. The shaped abrasive particle fraction of claim 1, wherein the body comprises alumina.

16. The shaped abrasive particle fraction of claim 1, wherein the body comprises at least 90 wt % alumina for the total weight of the body.

17. The shaped abrasive particle fraction of claim 1, wherein the upper surface comprises an axis extending from the tip corner to a midpoint of the rear edge, wherein at least one point along the axis is lower in height than the first upper edge.

18. The shaped abrasive particle fraction of claim 17, wherein at least one point along the axis is lower in height than the second upper edge.

19. The shaped abrasive particle fraction of claim 1, wherein the at least one rear corner and the tip corner are located on the concave surface.

20. The shaped abrasive particle fraction of claim 19, wherein, relative to the tip corner, the at least one rear corner is located at a higher position on the body as viewed from the side.

* * * * *